United States Patent [19]

Bansal et al.

[11] Patent Number: 4,874,972
[45] Date of Patent: Oct. 17, 1989

[54] MAGNETIC ISOLATION AND COOLING SYSTEM IN DYNAMOELECTRIC MACHINES

[75] Inventors: Madan L. Bansal; William A. Byrd, both of Rockford, Ill.

[73] Assignee: Sundstrand Corporation, Rockford, Ill.

[21] Appl. No.: 139,638

[22] Filed: Dec. 30, 1987

[51] Int. Cl.⁴ ............................................. H02K 9/08
[52] U.S. Cl. ..................................... 310/57; 310/59; 310/89; 310/168; 310/256
[58] Field of Search ................. 310/52, 53, 54, 57, 310/58, 59, 60 R, 46, 64, 65, 89, 258, 263, 152, 168, 169, 170, 171, 85, 256; 336/60

[56] References Cited

U.S. PATENT DOCUMENTS

| | | | |
|---|---|---|---|
| 2,922,056 | 1/1960 | Jaeschke | 310/54 |
| 3,030,529 | 4/1962 | Jaescheke | 310/54 |
| 3,184,624 | 5/1965 | Solomon | 310/54 |
| 3,218,491 | 11/1965 | Walsh et al. | 310/57 |
| 3,319,100 | 5/1967 | Erickson | 310/263 |
| 3,321,652 | 5/1967 | Opel | 310/263 |
| 3,346,749 | 10/1967 | Shafranek | 310/263 |
| 3,440,461 | 4/1969 | Potter | 310/54 |
| 3,467,844 | 9/1969 | Bird | 310/168 |
| 3,567,975 | 2/1971 | Blosack | 310/54 |
| 3,591,816 | 7/1971 | Sakamoto | 310/263 |
| 3,617,782 | 11/1971 | Nakamura | 310/263 |
| 4,275,323 | 6/1981 | Hatch | 310/52 |
| 4,297,604 | 10/1981 | Tawse | 310/168 |
| 4,385,251 | 5/1983 | Mallick et al. | 310/178 |
| 4,435,662 | 3/1984 | Tawse | 310/54 |
| 4,517,479 | 5/1985 | Aleem | 310/54 |
| 4,531,357 | 7/1985 | Weber et al. | 310/57 |
| 4,581,555 | 4/1986 | Kuznetsov et al. | 310/256 |
| 4,598,233 | 7/1986 | Glennon | 310/53 |
| 4,644,210 | 2/1987 | Meisner | 310/54 |

FOREIGN PATENT DOCUMENTS 0883827 12/1961 United Kingdom .................. 310/54

Primary Examiner—R. Skudy
Attorney, Agent, or Firm—Wood, Dalton, Phillips Mason & Rowe

[57] ABSTRACT

In a dynamoelectric machine which includes a rotor and a stator, an integral magnetic isolation and cooling system. A housing is disposed about the machine, the housing being fabricated of magnetically permeable material to define a flux path therethrough. A cooling jacket is sandwiched between the housing and the stator. The cooling jacket has coolant passages therein and is fabricated of non-magnetic material to isolate the flux path between the housing and the stator.

6 Claims, 1 Drawing Sheet

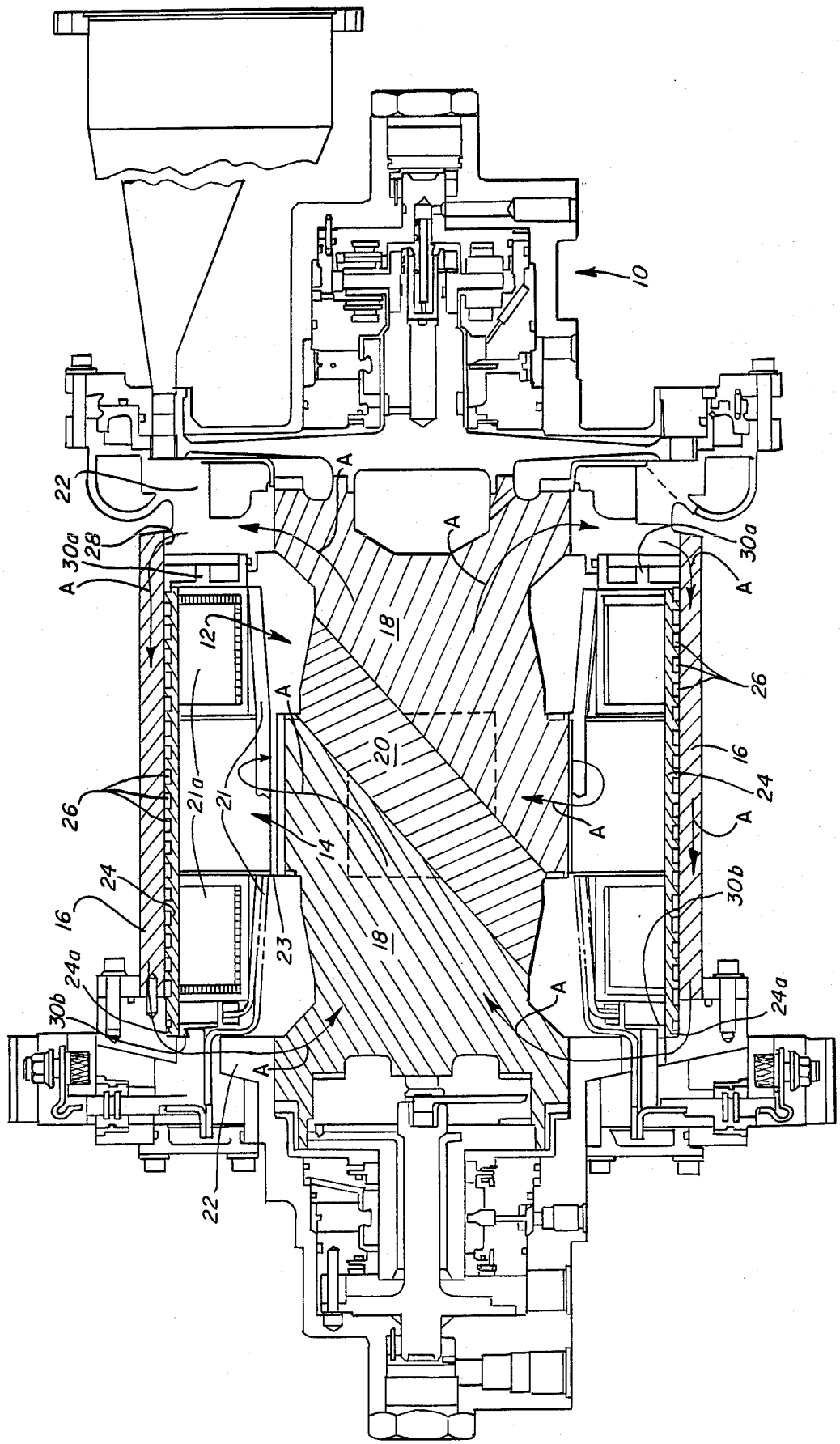

MAGNETIC ISOLATION AND COOLING SYSTEM IN DYNAMOELECTRIC MACHINES

FIELD OF THE INVENTION

This invention generally relates to dynamoelectric machines and, particularly, to an integral magnetic isolation and cooling system for the stator of a dynamoelectric machine.

BACKGROUND OF THE INVENTION

Dynamoelectric machines, such as generators and motors, have a rotor and a stator. An air gap is maintained between the rotor and the stator, the stator conventionally comprising windings surroundings the rotor. The windings generate heat and usually must be cooled.

In addition, the machine conventionally is encased within a housing or frame and other mounting components. A flux path is created circumferentially about the stator windings. Attempts often are made to define or "guide" the magnetic flux through a particularly desired path.

Heretofore, cooling of the stator windings and direction of the flux path have been two different problems approached in separate manners. This often results in an unduly number of parts for the machine which would include various components defining cooling passages about the stator as well as additional components to direct or define the flux path.

This invention is directed to such a dynamoelectric machine in which an integral magnetic isolation and cooling system is employed.

SUMMARY OF THE INVENTION

An object, therefore, of the invention is to provide an integral magnetic isolation and cooling system in a dynamoelectric machine.

In the exemplary embodiment of the invention, a housing or frame is provided circumferentially about the machine. The housing extends axially and substantially surrounds the machine in a radial direction. The housing is fabricated of magnetic material to define a flux path therethrough emanating from the center rotor area of the machine. A cooling jacket is sandwiched between the housing and a stator. The cooling jacket has coolant passage means to cool the stator and also is fabricated of non-magnetic material to isolate the flux path through the housing from the stator. Thereby, the cooling jacket performs dual functions.

As disclosed herein, the cooling jacket projects axially beyond the ends of the stator. Non-magnetic end members are provided at opposite ends of the stator, the non-magnetic members radially abutting the projecting portions of the cooling jacket and may contain additional cooling passages.

Other objects, features and advantages of the invention will be apparent from the following detailed description taken in connection with the accompanying drawings.

BRIEF DESCRIPTION OF THE DRAWING

The features of this invention which are believed to be novel are set forth with particularity in the appended claims. The invention, together with its objects and the advantages thereof, may be best understood by reference to the following description taken in conjunction with the accompanying drawing, in which the singular FIGURE is an axial section through a dynamoelectric machine embodying the integral magnetic isolation and cooling system of the invention.

DETAILED DESCRIPTION OF THE PREFERRED EMBODIMENT

Referring to the drawing in greater detail, a dynamoelectric machine, generally designated 10, is illustrated. The machine is shown as a Lundell-Rice type generator. Of course, the invention is equally applicable for other types of dynamoelectric machines.

Specifically, the Rice generator includes a tripart rotor, generally designated 12, and a stator assembly, generally designated 14, within a housing 16. The tripart rotor 12 includes a pair of magnetic parts 18 sandwiching and fused together with a non-magnetic part 20. Stator assembly 14 includes main windings 21 and field coils 21a. The stator assembly is located between end bells 22. An air gap 23 is maintained between the rotor and the stator assembly. The housing can be seen to extend axially of the machine and substantially surround the components in a radial direction. Typically, the housing is generally cylindrical in shape. This general description is typical of a Lundell-Rice type generator, and all of the other detailed components, such as bearings, mounting flanges, fasteners, etc. have been deleted because they are common in the art with this type of machine.

The invention contemplates fabricating housing 16 of magnetically permeable material to define a flux path therethrough. Therefore, a flux path is illustrated through the machine and circumferentially around stator main windings field coils 21a by arrows "A". It can be seen that the flux path would travel through rotor 12 and magnetic housing 22 in a circumferential manner around stator main windings 21.

The invention also contemplates providing a cooling jacket 24 which circumferentially surrounds stator assembly 14. With a cylindrically configured machine, the cooling jacket also would be cylindrically configured. The jacket is sandwiched between stator assemby 14 and housing 16, as shown. The jacket extends axially beyond the field coils to maintain magnetic flux isolation from the flux path to end bells 22, as shown by arrows "A".

Cooling jacket 24 performs the dual function of providing means to cool the stator and field coils 21a as well as to isolate the flux path to housing 16. To this end, the cooling jacket is fabricated of non-magnetic material. In addition, the jacket has circumferential cooling channels 26 about the exterior surface thereof. The channels combine with interior wall 28 of housing 16 to define cooling passages circumferentially about stator assembly 14. Coolant is directed to the passages by appropriate conduit means. Therefore, it can be seen that a singular component in the form of cooling jacket 24 performs the integrated dual function of magnetic isolation and cooling within the system of the machine.

To further isolate the flux path defined by arrows "A", end members 30a and 30b are provided at opposite ends of stator assembly 14. These end members are fabricated of non-magnetic material. End member 30a axially abuts the right-hand end of cooling jacket 24. End emmber 30b radially abuts the inside of projecting portion 24a of the cooling jacket. Of course, both end members 30a, 30b are annular in shape to substantially enclose the ends of the stator and field coils 21a. With such shapes, the end members combine with the cylindrical cooling jacket to substantially isolate the stator from the surrounding housing components of the machine, particularly housing or frame 16 which is magnetically permeable and defines the flux path axially along the outside of the stator.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

We claim:

1. In a dynamoelectric machine, an integral magnetic isolation and cooling system, comprising:
   a central rotor;
   a stator about the rotor;
   an independent housing about the stator and fabricated of magnetically permeable material to define a flux path therethrough;
   a cooling jacket about the stator between the housing and the stator, the cooling jacket having coolant passage means and being fabricated of non-magnetic material to isolate the flux path between the housing and the stator and around the cooling jacket; and
   end members of non-magnetic material at opposite ends of the stator to facilitate isolating the flux path between the housing and the stator.

2. The system of claim 1 wherein the housing and the cooling jacket extend axially of the machine and substantially surround the stator in a radial direction.

3. The system of claim 2 wherein the cooling jacket and housing are generally cylindrical.

4. The system of claim 1 wherein at least one end of the cooling jacket projects axially beyond the ends of the stator and said end members radially abut projecting portions of the jacket.

5. The system of claim 1 wherein said end members engage opposite ends of the cooling jacket.

6. In a dynamoelectric machine, an integral magnetic isolation and cooling system, comprising:
   a central rotor;
   a stator about the rotor;
   a generally cylindrical housing about the machine fabricated of magnetically permeable material to define a flux path therethrough;
   a generally cylindrical, cooling jacket about the stator and sandwiched between the housing and the stator, the cooling jacket having coolant passage means and being fabricated of non-magnetic material to isolate the flux path between the housing and the stator and around the cooling jacket; and
   end members of non-magnetic material inside the housing at oppostie ends of the stator to facilitate isolating the flux path between the housing and the stator.

* * * * *